United States Patent [19]

Muller

[11] 3,824,864

[45] July 23, 1974

[54] BELT DRIVES

[75] Inventor: Jean Calude Muller, Palaiseau, France

[73] Assignee: Massey-Ferguson Services N.V., Curacao, Netherlands Antilles

[22] Filed: May 24, 1973

[21] Appl. No.: 363,678

[30] Foreign Application Priority Data
June 14, 1972 Great Britain.................. 27751/72

[52] U.S. Cl.................... 74/242.15 R, 74/230.17 D
[51] Int. Cl......................... F16h 7/10, F16h 55/22
[58] Field of Search............ 74/230.17 D, 242.15 R

[56] References Cited
UNITED STATES PATENTS 3,628,390 12/1971 Van Der Lely.......... 74/230.17 D X
3,759,342 9/1973 Plamper................... 74/230.17 D X

*Primary Examiner*—Leonard H. Gerin
*Attorney, Agent, or Firm*—Robert L. Farris

[57] ABSTRACT

Belt tension control apparatus having a pulley mounted at one end of a lever arm. The arm is connected at its other end to a coiled tension spring and pivotally mounted between its ends on a support. The position of the pivot along the support may be adjusted. Decrease in belt tension resulting from belt stretch is indicated visually by angular movement of the arm from a reference position at right angles to the support. After position adjustment of the pivot to restore the arm to its reference position following belt stretch, the degree of extension of the spring is greater than before the stretch occurred.

10 Claims, 4 Drawing Figures

BELT DRIVES

This invention relates to belt drives and in particular to a belt tensioner for a belt drive. The invention is applicable, for example, to variable ratio belt drives suitable for use in combine harvesters to transmit drive from the engine to the ground wheels thereof.

It is well known that a drive belt should be operated at a particular tension in order to obtain optimum performance and life from it. The inevitable stretching of a drive belt during use tends to cause a reduction in its tension. To offset this tendency various belt tensioners have been proposed, such as spring-biassed jockey pulleys. However in many cases such belt tensioners are not satisfactory since they do not meet the requirement, which arises in various belt drive arrangements, that, in order to maintain the belt tension constant, an increasing bias must be applied to a belt tensioning pulley as the belt progressively stretches. This requirement arises from changes in the angular relationship between the belt or belts and the pulley or pulleys, and is more fully explained in our United States Patent specification No. 3,494,210.

An object of the present invention is to provide an improved belt tensioner.

According to the invention there is provided a belt tensioner comprising a belt-engageable member, bias means connected to said belt-engageable member and operative to maintain belt tension after belt stretch has occurred, an indicator connected to said belt-engageable member and operative to indicate when belt stretch has occurred and responsive to movement of said member by said bias means to take-up said belt stretch, and adjustment means whereby the bias applied by said bias means may be adjusted when said indicator shows that belt stretch has occurred characterized in that adjustment of said adjustment means to restore said indicator to a reference position after said belt stretch has occurred increases said bias to a level higher than that which was provided before said belt stretch occurred.

Preferably, said belt-engageable member is mounted on an arm, said arm is pivotally mounted on a support member therefor, and said bias means is connected to said arm, the pivot connection between said arm and said support member being position-adjustable with respect to said support member and being located at a position on said arm between the connection of said arm to said bias means and the connection of said arm to said belt-engageable member.

An embodiment of the invention will now be described by way of example with reference to the accompanying drawings in which.

Figure 1:
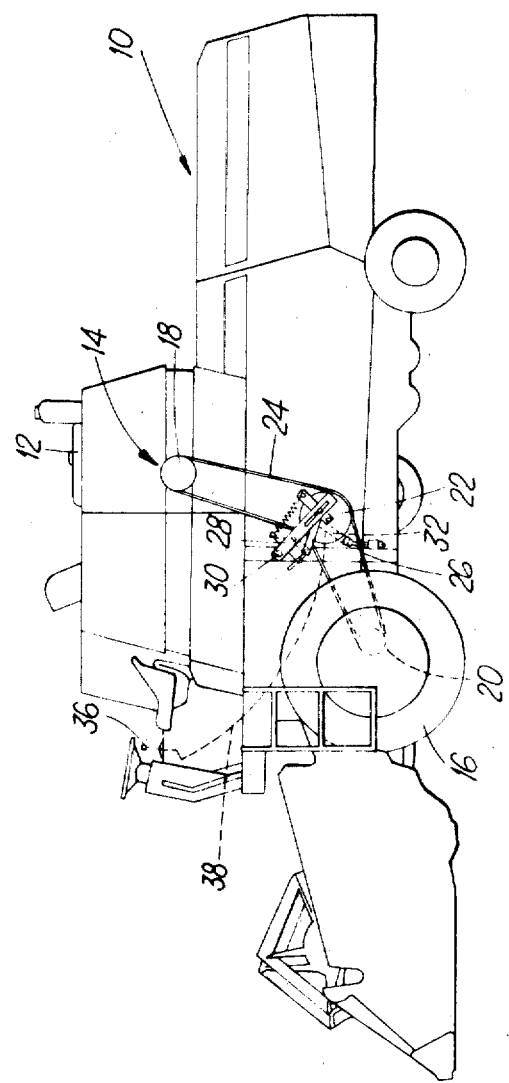
FIG. 1 shows a side elevation of a combine harvester.

As shown in FIG. 1, a combine harvester 10 has an engine 12 and a belt drive 14 whereby a pair of ground-engaging traction wheels 16 are rotated to propel the machine.

Belt drive 14 comprises driving and driven V-belt pulleys 18, 20 respectively, an intermediate variable diameter double V-belt pulley 22 and a pair of V-belts 24, 26.

Variable pulley 22 is mounted on a support member in the form of a pair of laterally spaced arms 28, 29 pivoted on a pin 30 for swinging movement towards pulley 18 or pulley 20 under the control of a double-acting hydraulic ram 32 acting on arm 29. Extension and retraction of ram 32 to change the ratio of belt drive 14 is effected from the control platform 34 of the combine by means of a hand lever 36 and an associated hydraulic control circuit 38.

Figure 2:
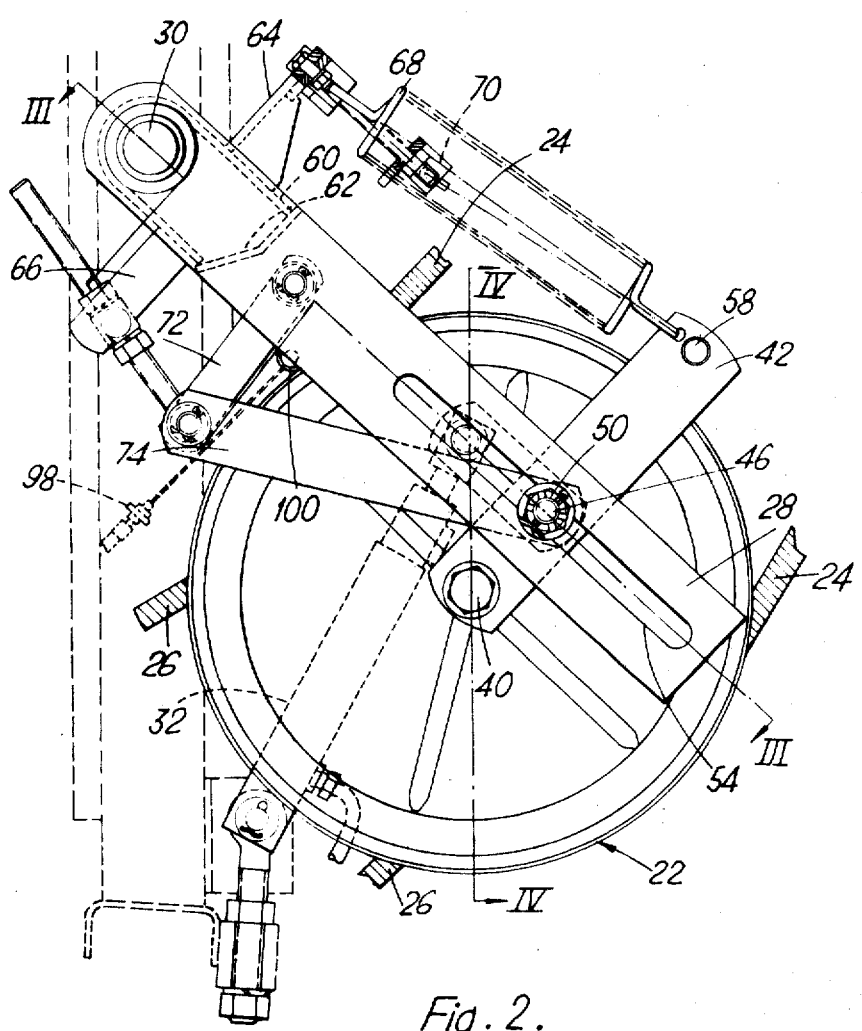
FIG. 2 shows in elevation part of a variable ratio belt drive of the combine of FIG. 1.
Figure 3:
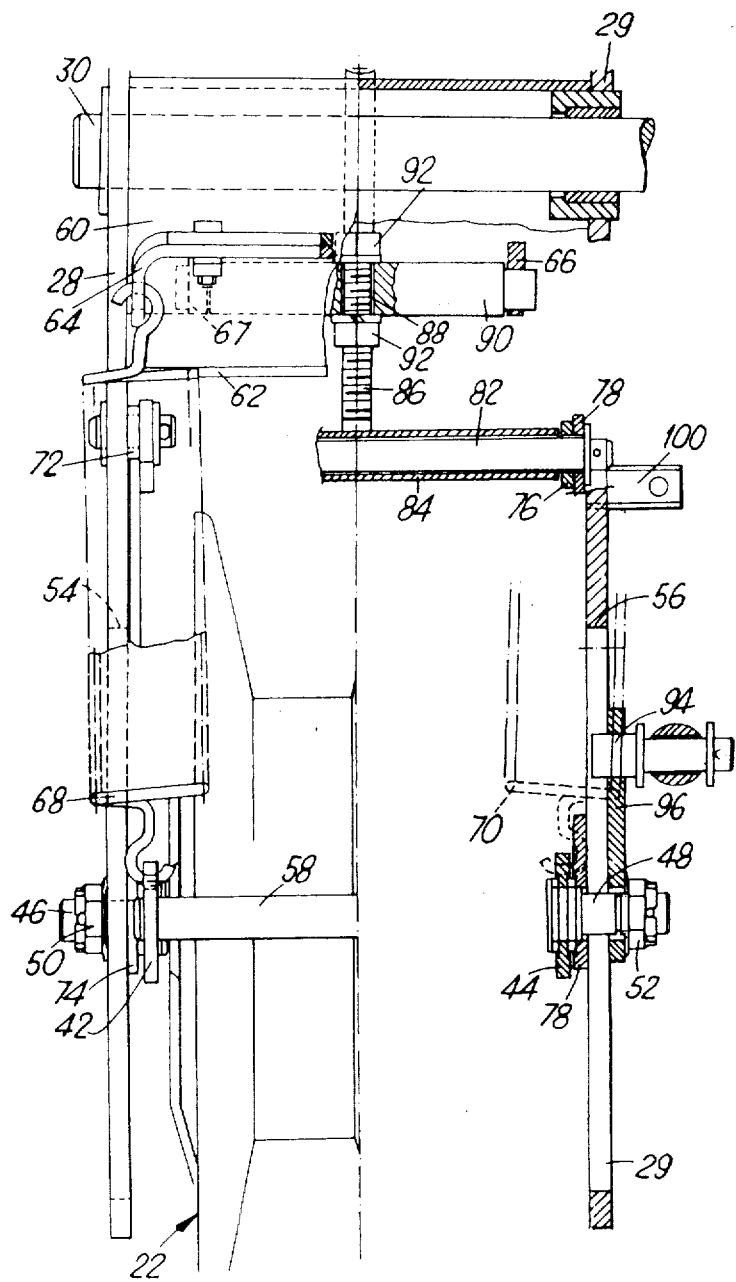
FIG. 3 shows the device of FIG. 2, partly in plan view and partly sectioned on the line III—III in FIG. 2.
Figure 4:
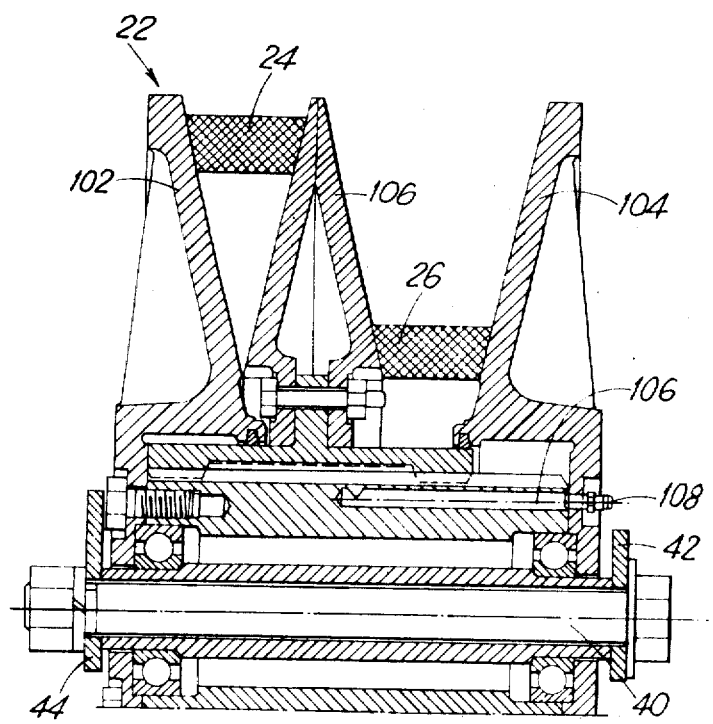
FIG. 4 shows part of a section on the line IV—IV in FIG. 2.

Details of the construction and mounting of variable pulley 22 are shown in FIGS. 2, 3 and 4.

Variable pulley 22 is freely rotatably mounted on a pin 40 at one end of a pair of laterally spaced lever arms 42, 44. The lever arms constitute an indicator, for a purpose to be described. Intermediate their ends, the lever arms are pivotally mounted on the support arms 28, 29 by adjustment means comprising pivot bolts 46, 48 located in slots 54, 56 formed in the support arms, and associated lockable castellated nuts 50, 52. At their other ends, lever arms 42 44 are inter-connected by a pin 58.

Support arms 28, 29 are rigidly inter-connected by a U-shaped strap 60 which extends around pin 30, and an associated transverse end plate 62 which together provide a rigid support for a U-shaped bracket 64 above the support arms and a pair of transversely spaced lower brackets 66, 67 below the support arms.

A pair of coiled tension springs 68, 70 constituting bias means interconnect bracket 64 and lever arms 42, 44 so as to bias pulley 22 to the right as seen in FIG. 2 and set up tension in both drive belts 24, 26. The position of spring 70 has been ghosted-in on FIG. 2 for the sake of clarity to indicate its position.

Lever arms 42, 44 can be position-adjusted along the slots 54, 56 formed in support arms 28, 29 for a purpose to be described, by means of an adjustment mechanism. The adjustment mechanism comprises two pairs of links, 72, 74 and 76, 78. The link 72 is pivotally connected by a pin 80 to support arm 28, and link 76 is similarly mounted on swinging arm 29. The links 72, 76 are pivotally connected to their respective links 74, 78 at one end thereof by a common transverse pin 82. The links 74, 78 are connected at their other ends to the pivot bolts 46, 48 respectively.

A sleeve 84 which is a running fit on transverse pin 82 has a threaded adjustment bolt 86 welded thereto. The adjustment bolt extends through a clearance opening 88 formed in a transverse reaction member 90 mounted on the lower brackets 66, 67. A pair of adjustment nuts 92 are provided on opposite sides of the reaction member. Adjustment of nuts 92 moves the variable pulley 22 along the support arms 28, 29 by altering the angle between links 72 and 74, and 76 and 78.

Hydraulic ram 32 is connected to support arm 29 through a boss 94 which extends through a link 96 connected to the pivot bolt 48 and which is a sliding fit in the slot 56. Adjustment of the position of pulley 22 therefore moves ram 32 along with the pulley.

A bowden cable 98 is connected at one end to a bracket 100 on support arm 29 and at the other end to a dial (not shown) on the control platform of the combine, to provide an indication of the drive ratio setting of pulley 22.

FIG. 4 shows details of the construction of pulley 22 including the fixed lateral cast iron sheaves 102, 104, the axially slidable central cast iron sheave 106, and lubrication passage 107 for grease introduced through nipple 108.

Use of the invention will now be described.

Tension springs 68, 70 are chosen so that when the belt drive is originally installed on the combine and lever arms 42, 44 set at right angles to support arms 28, 29, the tension in belts 24, 26 is optimum.

The ground speed of the combine is controlled by the operator by means of hand lever 36 as already described.

When the belts stretch, levers 42, 44 are moved anticlockwise, as seen in FIG. 2, relative to the support arms 28, 29 about pivot bolts 46, 48 by the tension springs 68, 70 to keep the belts under tension. Each morning before commencing work with the combine, the operator visually checks whether indicator arm 42 is at right angles to support arm 28. If the angle is significantly different from a right angle the operator slackens nuts 50, 52 and then adjusts nuts 92 to bring it back to a right angle.

It will be appreciated that after such adjustment the degree of extension of the tension springs is greater than when arm 42 was at right angles to arm 28 before the belt stretch occurred.

The geometry and constants of the system are chosen to be such that this increase in extension offsets the belt-tension-reducing effect of the bodily movement of pulley 22 away from the imaginary line joining the axes of pulleys 18, 20.

Thus it is necessary only to adjust nuts 92 until the lever arm 42 is at right angles to support arm 28 so as to restore the tension in belts 24, 26 to the correct level at any time during the life of the belts. This can be done quickly and easily.

A further advantage of the embodiment described above is that the position of the pivot 46 on lever arms 42, 44 is such as to provide a mechanical advantage in favour of springs 68, 70, whereby these springs can be smaller and therefore cheaper than would otherwise be required to tension the belts.

I claim:

1. A belt tensioner comprising a belt-engageable member, bias means connected to said belt-engageable member and operative to maintain belt tension after belt stretch has occurred, an indicator connected to said belt-engageable member and operative to indicate when belt stretch has occurred and responsive to movement of said member by said bias means to take-up said belt stretch, and adjustment means whereby the bias applied by said bias means may be adjusted when said indicator shows that belt stretch has occurred characterized in that adjustment of said adjustment means to restore said indicator to a reference position after said belt stretch has occurred increases said bias to a level higher than that which was provided before said belt stretch occurred.

2. The belt tensioner of claim 1 wherein said belt-engageable member is mounted on an an arm, said arm is pivotally mounted on a support member therefor, and said bias means is connected to said arm, the pivot connection between said arm and said support member being position-adjustable with respect to said support member and being located at a position on said arm between the connection of said arm to said bias means and the connection of said arm to said belt-engageable member.

3. The belt tensioner of claim 2 wherein said pivot connection between said arm and said support member is nearer to said connection of said arm with said belt engageable member than to said connection of said arm to said bias means.

4. The belt tensioner of claim 2 wherein said bias means comprises a coiled tension spring.

5. The belt tensioner of claim 4 wherein said tension spring acts between said arm and said support member.

6. The belt tensioner of claim 2 wherein said support member is adapted to be mounted for pivotal movement, and said belt-engageable member comprises a variable diameter vee belt pulley.

7. The belt tensioner of claim 6 wherein thrust means connected to said support member is provided to effect pivotal movement thereof whereby in use the effective diameter of said vee belt pulley may be changed.

8. The belt tensioner of claim 1 wherein said adjustment means includes a manually operable screw-threaded thrust mechanism connected to the pivot to provide stepless position-adjustment thereof.

9. A belt drive comprising a drivable power input pulley, a drive belt, and a belt tensioner according to claim 1 engageable with said belt.

10. A combine harvester having driven ground wheels or tracks and a variable ratio belt drive to said ground wheels or tracks, said drive including a variable diameter vee belt pulley constituting the belt-engageable member of a belt tensioner according to claim 1.

* * * * *